MAXIMUM AMPLITUDE PULSE SELECTOR

Filed July 2, 1964

INVENTORS.
DAVID J. COMER
HERMAN A. FERRIER
BY
John H. Holcombe
ATTORNEY

United States Patent Office 3,317,754
Patented May 2, 1967

3,317,754

MAXIMUM AMPLITUDE PULSE SELECTOR

David J. Comer and Herman A. Ferrier, San Jose, Calif., assignors to International Business Machines Corporation, New York, N.Y., a corporation of New York Filed July 2, 1964, Ser. No. 379,958
8 Claims. (Cl. 307—88.5)

This invention relates to a signal level detector, and particularly relates to means for determining which one of a plurality of signals has the largest amplitude.

In many instances, it has been found desirable to determine which one of a plurality of incoming electrical signals has the largest amplitude. For example, in certain pattern matching systems the pattern having the best match produces the output pulse having the greatest amplitude, and it is desirable to determine which pulse is so identified.

Therefore, it is an object of the present invention to provide a novel circuit for determining and indicating which one of a plurality of incoming signals has the largest amplitude.

Briefly, in accordance with this aspect of my invention, a circuit is provided for charging a capacitor to the voltage level of each incoming pulse if the pulse amplitude is greater than the charge on the capacitor, and providing an output each time the charge on the capacitor is increased.

Previous circuits for determining which one of a plurality of signals has the largest amplitude are only able to select from among a small number of pulses or during a relatively short period of time.

Thus, another object of this invention is to provide apparatus which is capable of selecting from among a large number of pulses occurring over a relatively great time interval to indicate and determine which one of the plurality of incoming signals has the largest amplitude.

Briefly, in accordance with this latter aspect of my invention, apparatus is provided for charging a relatively small capacitor to the voltage level of each incoming pulse if the pulse amplitude is greater than the charge on the capacitor, transferring this voltage level to a larger capacitor, and providing an output pulse each time the charge on the large capacitor is increased.

The foregoing and other objects, features and advantages of the invention will be apparent from the following more particular description of preferred embodiments of the invention, as illustrated in the accompanying drawings, in which.

Figure 1:
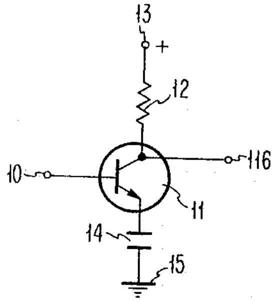
FIG. 1 is a schematic circuit diagram of a maximum amplitude pulse detector constructed in accordance with the first aspect of my invention.

Referring to FIG. 1, the incoming signal is applied to line 10, which is connected to the base terminal of a transistor 11. A resistor 12 is connected between the collector of the transistor 11 and a positive voltage supply at terminal 13. The output 16, taken from the collector of the transistor, is normally at the supply potential, but decreases when the transistor conducts.

Figure 2:
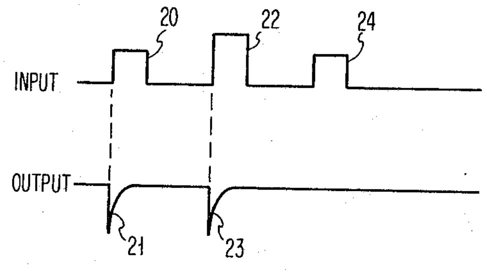
FIG. 2 is an illustration of waveforms appearing from operation of the circuit of FIG. 1.

The operation of the circuit of FIG. 1 is illustrated by referring additionally to FIG. 2. As the first input pulse 20 is applied at the input 10, transistor 11 conducts current from power supply 13 through resistor 12 until capacitor 14 charges to the voltage of the input pulse. The current flow through resistor 12 reduces the voltage of output terminal 16, as shown by the down-going portion of pulse 21. As capacitor 14 charges toward the voltage of input pulse 20, the current through resistor12 decreases proportionately, thereby increasing the voltage at output terminal 16. Upon capacitor 14 charging to the amplitude of input pulse 20, transistor 11 is turned off, causing the voltage at output terminal 16 to again assume the voltage of power supply 13.

Capacitor 14 remains charged at the voltage of input pulse 20, subject to a small discharge due to the leakage current of transistor 11. Assuming that the amplitude of input pulse 22 exceeds the voltage on capacitor 14, the transistor will again conduct. As before, when the transistor 11 conducts, the voltage at output line 16 decreases until capacitor 14 charges to a voltage equal to that of input pulse 22. This results in the production at line 16 of output pulse 23.

Assuming that the amplitude of the final input pulse 24 is less than the voltage on capacitor 14 at that time, transistor 11 does not become forward biased and does not conduct. Output line 16 therefore remains at the voltage of power supply 13.

Thus, the circuit of FIG. 1 produces an output pulse each time the amplitude of an input pulse exceeds the charge on capacitor 14. In this way, the last output pulse 23 appearing on line 16 is indicative that the corresponding input pulse 22 has the largest amplitude of the train of pulses sampled by the circuit. The circuit can be reset at any time by discharging capacitor 14 to ground.

Figure 3:
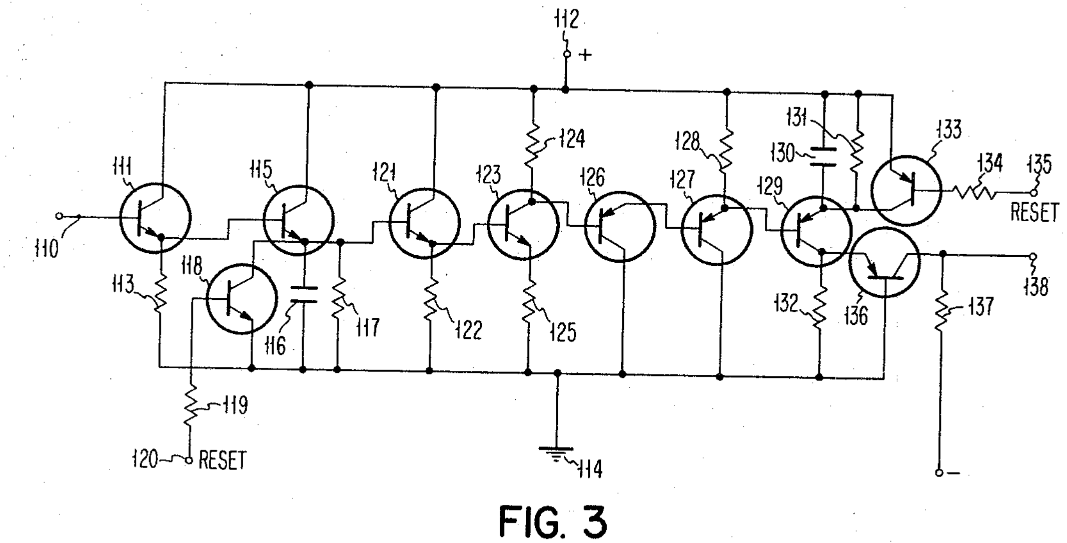
FIG. 3 is a schematic circuit diagram of a maximum amplitude pulse detector constructed in accordance with the second aspect of my invention; and, FIG. 4 is an illustration of waveforms appearing from operation of the circuit of FIG. 3.

A circuit designed in accordance with the second aspect of my invention is shown in FIG. 3. This circuit is capable of detecting pulses of a very narrow width and will retain the charge over an extended period of time, thereby allowing sampling of a large number of pulses.

The incoming signal is applied to input line 110 which is connected to the base terminal of a transistor 111, which is arranged in the emitter follower configuration with the collector connected to voltage power supply 112 and the emitter connected through resistor 113 to ground terminal 114. The output is taken from the emitter of transistor 111 and applied to the base terminal of transistor 115. The collector of transistor 115 is connected to power supply 112, and capacitor 116 and resistor 117 are connected in parallel between the emitter of transistor 115 and ground terminal 114.

The arrangement of transistors 111 and 115 presents a low impedance to the input on line 110, and allow capacitor 116 to charge to the voltage of the input pulse in less than one microsecond.

A transistor 118 is connected across capacitor 116, and is connected by means of resistor 119 to terminal 120. The application of a positive pulse at terminal 120 allows transistor 118 to conduct and thereby discharge capacitor 116, resetting the circuit when desired. Capacitor 116 is connected to transistor 121 and resistor 122, which form an emitter follower connected to the base terminal of transistor 123. The emitter follower thus formed transmits the voltage established across capacitor 116 to transistor 123.

Transistor 123, resistors 124 and 125, and transistor 126 comprise an inverter which inverts the signal received from emitter follower 121 and applies the resultant signal to the base terminal of transistor 127. Transistor 127 and resistor 128 comprise an emitter follower circuit which transmits the signal received from tansistor 126 to the base terminal of transistor 129.

Capacitor 130 and resistor 131 are connected in parallel between power supply 112 and the emitter terminal of transistor 129. Resistor 132 is connected between the collector terminal of transistor 129 and ground terminal 114. If the inverted pulse applied to the base terminal of transistor 129 is of greater amplitude than the voltage across capacitor 130, transistor 129 conducts in a manner similar to transistor 11 of FIG. 1. As transistor 129 conducts, current is drawn through resistor 132, thereby creating a voltage potential which is applied to the common base amplifier formed by transistor 136. Transistor 136 and resistor 137 convert the absence or presence of a voltage potential across resistor 132 into logic level pulses which are transmitted to output line 138.

Transistor 133 is connected across capacitor 130, and is connected by means of resistor 134 to reset terminal 135. The appearance of a positive pulse at reset terminal 135 therefore causes transistor 133 to conduct, thereby discharging capacitor 130. Coincident application of pulses at terminals 120 and 135 discharges capacitors 116 and 130, thereby resetting the circuit so that a new train of pulses may be sampled.

Figure 4:
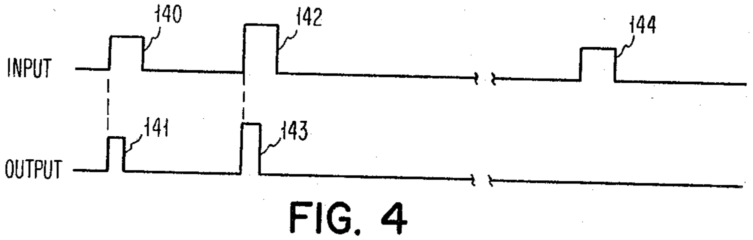

The operation of the circuit of FIG. 3 is illustrated by referring additionally to the waveforms of FIG. 4.

Upon the application of the first input pulse 140 to input terminal 110, transistors 111 and 115 transmit the pulse to capacitor 116, which charges toward the voltage of input pulse 140. Upon the voltage appearing across capacitor 116 reaching the amplitude of pulse 140, transistor 115 is no longer forward biased and no longer conducts. As stated above, since transistor 111 is an emitter follower with low output impedance, capacitor 116 charges in less than one microsecond when an input pulse is present.

The capacitor will not discharge appreciably through resistor 117 for more than 100 microseconds. During this time, the emitter follower transmits the voltage level on capacitor 116 to the input to transistor 123. The inverter formed by transistors 123 and 126 then inverts the signal and applies the same to emitter follower 127. Emitter follower 127 transmits the inverted voltage level to transistor 129. Since the voltage thus appearing across resistor 128 is greater than that appearing across capacitor 130, transistor 129 will become forward biased, charging capacitor 130. Capacitor 130 has a 20-microsecond charging time, and slowly charges to the voltage appearing across resistor 128. Thus, it is important that capacitor 116 maintain the voltage level of the input pulse 140 so that the input pulse need not be of duration sufficient to charge capacitor 130.

During the time that transistor 129 is forward biased and conducting, the current to charge capacitor 130 is drawn through resistor 132. The voltage potential thus created across resistor 132 is amplified and converted into a logic level pulse by transistor 136 and resistor 137 and is provided as output pulse 141 at terminal 138.

At some later time, pulse 142 is applied to input 110. Since this voltage is greater than that present across capacitor 116, transistor 115 becomes forward biased and charges the capacitor to the amplitude of pulse 142. The voltage level is then transmitted, inverted, and applied to transistor 129. Since the voltage level so applied is greater than the voltage appearing across capacitor 130, transistor 129 is forward biased, again charging capacitor 130. The current then flowing through resistor 132 creates a voltage pulse which is amplified by transistor 136 and supplied as output pulse 143 at output terminal 138.

Assume that input pulse 144 appears at some later time, for example 50 milliseconds later, perhaps following a number of input pulses of low amplitude. By that time, capacitor 116 has discharged to a considerable extent. Thus, input pulse 144, as transmitted by transistor 111, causes transistor 115 to become forward biased and to charge capacitor 116 to the voltage level of pulse 144.

Again, this voltage level is inverted and transmitted to transistor 129. However, capacitor 130 retains its charge over a considerable length of time, and has not noticeably discharged in the 50-millisecond period. Therefore, transistor 129 remains reverse biased even after the application of the voltage level caused by input pulse 144. Since transistor 129 remains reverse biased, no current is conducted through resistor 132 and no output pulse appears at output terminal 138.

Therefore, it is seen that the circuit of FIG. 3 produces an output pulse at terminal 138 each time an input pulse is received having an amplitude greater than that of any previous pulse in the train of pulses, and does not produce an output if the input pulse is of lower amplitude than a previous input pulse even though a considerable period of time may exist between pulses.

In a typical circuit constructed in accordance with FIG. 3 above for determining which one of a train of incoming electrical pulses has the largest amplitude, wherein the maximum input pulse width is ten microseconds, the pulses occur at least 50 microseconds apart, and a maximum of approximately 1,000 pulses may be examined during a 50-millisecond train of pulses, elements having the following values were utilized:

resistor 113—100,000 ohms,
capacitor 116—.01 microfarad,
resistor 117—10,000,000 ohms,
resistor 122—1,000,000 ohms,
resistors 124 and 125—3,000 ohms,
resistor 128—100,000 ohms,
capacitor 130—2 microfarads,
resistor 131—22,000,000 ohms,
resistor 132—10,000 ohms,
resistor 137—1,000 ohms,
transistors 111, 115, 118, 121 and 123—NPN,
transistors 126, 127, 129, 133 and 136—PNP.

In the above typical circuit constructed in accordance with FIG. 3, it is seen that, although capacitor 130 requires 20 microseconds to charge, the input pulse width can be much less than 20 microseconds and still capacitor 130 will charge to the proper value since capacitor 116 holds the voltage until capacitor 130 is so charged. Since capacitor 130 is large, it will not discharge appreciably for more than 50 milliseconds, and thus, the whole train of pulses can be examined and the maximum amplitude pulse accurately determined.

While the invention has been particularly shown and described with reference to preferred embodiments thereof, it will be understood by those skilled in the art that various changes in form and details may be made therein without departing from the spirit and scope of the invention.

What is claimed is:

1. Apparatus for detecting a series of received electrical signals and providing an output signal whenever one of said received signals has an amplitude greater than any prior received signal of said series, comprising:

storage means for storing, essentially unchanged, the voltage level of each signal supplied it at least until after the last signal in said series is received by said apparatus;

detecting and charging means for receiving said series of signals and detecting whether the maximum voltage level of each received signal is greater than the voltage stored by said storage means and, only if so, supplying to said storage means a voltage level corresponding to the maximum voltage level; and means providing an output signal each time the voltage stored by said storage means is increased by said detecting and charging means.

2. Apparatus for detecting a series of electrical input signals and providing an output signal each time the maximum voltage level of one of said input signal is greater than the maximum voltage level of any preceding one of said input signals in said series, comprising:

storage means for storing, essentially unchanged, the voltage level of each signal supplied it at least until after the last signal in said series is received by said apparatus; and switching means including one terminal adapted to receive said input signals, a second terminal connected to said storage means, said switching means being adapted to detect whether the maximum voltage level of each one of said input signals is greater than the voltage level stored by said storage means and, only if so, to supply to said storage means said maximum voltage level of said input signal, and a third terminal of said switching means, said switching means being adapted to provide an output signal on said third terminal each time said switching means charges said storage means.

3. Apparatus for receiving a series of electrical input pulses and providing an output signal each time the maximum voltage amplitude of one of said input pulses is greater than the maximum voltage amplitude of any of the preceding input pulses of said series, comprising:

an input terminal for receiving said input pulses;

a storage capacitor adapted to be charged to and store, essentially unchanged, the level of each signal supplied it until after the last signal in said series is received by said apparatus;

output means including a voltage power source; and a transistor having three terminals, wherein one terminal is connected to said input terminal, a second terminal is connected to said storage capacitor, and a third terminal is connected to said output means, said transistor being arranged to conduct and charge said storage capacitor only when the voltage amplitude at said input terminal exceeds the voltage appearing across said storage capacitor, and said output means being arranged to provide an output signal each time said transistor conducts.

4. Apparatus for detecting which one of a plurality of input pulses has the largest amplitude, comprising:

a storage capacitor having two terminals, said capacitor being adapted to be charged to and store, essentially unchanged, the level of each signal supplied it until after the last signal in said plurality is received by said apparatus;

a transistor, the emitter of which is connected to one terminal of said storage capacitor, said input pulses being applied between the base terminal of said transistor and the other terminal of said storage capacitor;

a power supply;

a resistor connected between said power supply and the collector of said transistor; and an output terminal connected to said collector of said transistor, whereby said transistor conducts only when the voltage of an input pulse between said base terminal of said transistor and said other terminal of said storage capacitor is greater than the voltage appearing across said storage capacitor, the conduction current charging said storage capacitor to the voltage level of said input pulse, said conduction current being transmitted from said voltage power supply through said resistance means to said collector, thereby producing a change in the voltage of said output terminal during said conduction and to signal that the voltage level of said input pulse is greater than that of any preceding one of said plurality of input pulses, the last such signal indicating the one of said input pulses having the largest amplitude.

5. Apparatus for detecting a series of received electrical signals and providing an output signal whenever one of said received signals has an amplitude greater than any prior received signal of said series, comprising:

a storage means for storing, essentially unchanged, the voltage level of each signal supplied it at least until after the last signal in said series is received by said apparatus;

detecting and charging means, including a second capacitor, for receiving said series of signals and detecting whether the maximum voltage level of each received signals is greater than the voltage stored by said storage means, and, only if so, supplying to said storage means a voltage corresponding to said maximum voltage level; and means providing an output signal each time the charge on said storage capacitor is increased by said charging means.

6. Apparatus for detecting a series of received electrical signals and providing an output signal whenever one of said received signals has an amplitude greater than any prior received signal of said series, comprising:

a first capacitor for temporarily storing the voltage level of each received signal supplied it;

means for receiving said series of signals and charging said first capacitor to a voltage level corresponding to the maximum voltage level of each received signal only when said corresponding voltage level is greater than the voltage appearing on said first capacitor;

a storage capacitor adapted to be charged to and store, essentially unchanged, the level of each signal supplied it until after the last signal in said series is received by said apparatus;

means interconnecting said first capacitor and said storage capacitor for detecting whether the voltage level stored by said first capacitor is greater than the voltage stored by said storage capacitor and charging said storage capacitor to a voltage level corresponding to said voltage level appearing on said first capacitor only when said voltage level is greater than the voltage appearing on said storage capacitor; and means providing an output signal each time the charge on said storage capacitor is increased by said interconnecting means.

7. Apparatus for detecting a series of input signals and providing an output signal each time the maximum voltage of one of said detected input signals exceeds the maximum voltage of any previously detected one of said series of input signals, comprising:

a first storage capacitor;

switching means for detecting said input signals, comparing the voltage of each of said input signals with the voltage appearing across said first storage capacitor, and, if said voltage of said input pulse is greater than said voltage across said first storage capacitor, charging said first storage capacitor to the maximum voltage of said detected input signal;

a second storage capacitor larger than said first storage capacitor adapted to be charged to and store, essentially unchanged, the level of each signal supplied it until after the last signal in said series is received by said apparatus;

a second switching means for detecting the voltage appearing across said first storage capacitor, comparing a voltage corresponding to said detected voltage and the voltage appearing across said second storage capacitor, and, only when said corresponding voltage is greater than said voltage appearing across said second storage capacitor, charging said second storage capacitor to said corresponding voltage; and output means for detecting the charging of said second storage capacitor by said switching means and providing an output signal in response thereto.

8. Apparatus for receiving a series of electrical input pulses and providing an output signal each time the maximum voltage amplitude of one of said input pulses is greater than the maximum voltage amplitude of any of the preceding input pulses of said series, comprising:

an input terminal for receiving said input pulses;

a first storage capacitor;

a first switching means interconnecting said input terminal and said first storage capacitor, said first switching means being adapted to charge said first storage capacitor to a voltage corresponding to the maximum voltage level of each one of said input signals if said corresponding voltage is greater than the voltage level across said first storage capacitor;

transmission means having an input terminal connected to said first storage capacitor and having an output terminal, said transmission means being arranged to supply, at said output terminal, a voltage level corresponding to the voltage level appearing across said first storage capacitor;

a second storage capacitor;

output means; and transistor means having three terminals, wherein one terminal is connected to said output of said transmission means, a second terminal is connected to said second storage capacitor, and a third terminal is connected to said output means, said transistor means being arranged to charge said second storage capacitor whenever the voltage amplitude at said output of said transmission means exceeds the voltage appearing across said second storage capacitor, and said output means being arranged to provide an output signal each time said transistor means charges said second storage capacitor.

References Cited by the Examiner

UNITED STATES PATENTS

| | | | |
|---|---|---|---|
| 2,621,263 | 12/1952 | Scoles | 328—151 X |
| 2,688,697 | 9/1954 | Lawson | 328—151 X |
| 3,041,470 | 6/1962 | Woodworth | 307—88.5 |

OTHER REFERENCES

Comer et al.: I.B.M. Technical Disclosure Bulletin, vol. 6, No. 10, March 1964; pp. 32, 33, p. 32 relied on.

References Cited by the Applicant

UNITED STATES PATENTS

| | | |
|---|---|---|
| 2,775,693 | 12/1956 | Berwin. |
| 3,004,174 | 10/1961 | Seidman. |

ARTHUR GAUSS, *Primary Examiner.*

D. D. FORRER, *Assistant Examiner.*